United States Patent [19]

Yamaguchi

[11] 4,373,489
[45] Feb. 15, 1983

[54] SPARK TIMING CONTROL SYSTEM

[75] Inventor: Hiroshi Yamaguchi, Yokosuka, Japan

[73] Assignee: Nissan Motor Company, Limited, Yokohama, Japan

[21] Appl. No.: 190,952

[22] Filed: Sep. 26, 1980

[30] Foreign Application Priority Data

Sep. 28, 1979 [JP] Japan .................. 54-124172

[51] Int. Cl.³ .................................... F02P 5/14
[52] U.S. Cl. .................. 123/422; 123/325; 123/417; 123/423
[58] Field of Search ............ 123/422, 416, 417, 423, 123/493, 325, 329

[56] References Cited

U.S. PATENT DOCUMENTS

| 4,112,895 | 9/1978 | Habert | 123/414 |
| 4,220,125 | 9/1980 | Nishida et al. | 123/407 |
| 4,257,363 | 3/1981 | Zeller | 123/423 |
| 4,259,723 | 3/1981 | Fujsawa et al. | 123/416 |
| 4,285,314 | 8/1981 | Kiencke et al. | 123/416 |

FOREIGN PATENT DOCUMENTS

| 2323619 | 11/1973 | Fed. Rep. of Germany . |
| 2655461 | 6/1977 | Fed. Rep. of Germany . |
| 2724487 | 12/1977 | Fed. Rep. of Germany . |
| 2737613 | 3/1978 | Fed. Rep. of Germany . |
| 2801642 | 7/1978 | Fed. Rep. of Germany . |
| 2816261 | 10/1978 | Fed. Rep. of Germany . |
| 2732781 | 2/1979 | Fed. Rep. of Germany . |
| 2155257 | 5/1973 | France . |
| 53-147135 | 12/1978 | Japan . |
| 54-81426 | 6/1979 | Japan . |
| 2033615 | 5/1980 | United Kingdom . |

Primary Examiner—Craig R. Feinberg
Assistant Examiner—Andrew M. Dolinar
Attorney, Agent, or Firm—Schwartz, Jeffery, Schwaab, Mack, Blumenthal & Koch

[57] ABSTRACT

A spark-timing control system is disclosed for an internal combustion engine having spark plugs and means adapted to cut off the supply of fuel to the engine under specified engine operating conditions including engine deceleration, low engine speed, and throttle idle position. The control system comprises a digital computer which performs the operational steps of: setting an optimum spark-timing value in terms of engine load; and providing an ignition signal to cause sparks at the spark plugs after a retard from the set optimum spark-timing value when engine acceleration occurs under a fuel cut-off condition.

6 Claims, 4 Drawing Figures

SPARK TIMING CONTROL SYSTEM

BACKGROUND OF THE INVENTION

1. Field of the Invention

The present invention relates to a spark-timing control system for use with an internal combustion engine having means for cutting off the supply of fuel to the engine under specified engine operating conditions, including engine deceleration.

2. Description of the Prior Art

The amount of fuel to automotive vehicle internal combustion engines is controlled by fuel control devices such as fuel injection devices or carburetors. Fuel cut-off systems have already been proposed for use with such fuel control devices to cut off the supply of fuel to the internal combustion engines during the deceleration mode of engine operation. This is effective to achieve high fuel economy and high exhaust emission purifying efficiency and to prevent exhaust emission purifying catalytic converters from overheating during engine deceleration.

It is a common practice to cut off the supply of fuel to an internal combustion engine in accordance with several engine operating conditions such as throttle position, engine speed and engine coolant temperature, for example, when the throttle valve is in its idle position, the engine speed is above a predetermined value, and the engine coolant temperature is above a predetermined value.

One difficulty with such conventional systems is that an engine torque change occurs causing an uncomfortable shock, when the engine operation is shifted between its fuel cut-off and fuel-delivery modes. Particularly upon fuel delivery resumption, the engine torque changes rapidly from zero value to produce an uncomfortable shock.

The present invention provides a spark-timing control system which can retard the spark-timing from the optimum spark-timing when the engine accelerates under a fuel cut-off condition. This operation is effective to achieve a smooth engine output torque change and to prevent the shock previously attendant upon engine re-acceleration.

SUMMARY OF THE INVENTION

The present invention provides a spark-timing control system for an internal combustion engine having spark plugs, means adapted to cut off the supply of fuel to the engine when the engine speed is above a given value during engine deceleration, and ignition means for producing sparks at the plugs. The system comprises a digital computer which performs the operational steps of: setting an optimum spark-timing value in terms of the load at which the engine is operating; and providing an ignition signal to cause the sparks at the spark plugs to occur after a retard from the optimum spark-timing value when engine acceleration occurs under a fuel cut-off condition.

The retard is set to a predetermined value when the lapse of time after engine acceleration occurs under the fuel cut-off condition is below a first predetermined value and is reduced gradually until the retard reaches zero when the time lapse is above the first predetermined value. The reduction of the retard may be effected by subtracting a constant from the retard at a predetermined interval. In addition, the retard may be set to zero when the time lapse is below a second predetermined value lower than the first predetermined value.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The details as well as other features and advantages of this invention are set forth below and are shown in the accompanying drawings, in which.

DESCRIPTION OF THE PREFERRED EMBODIMENT

Figure 1:
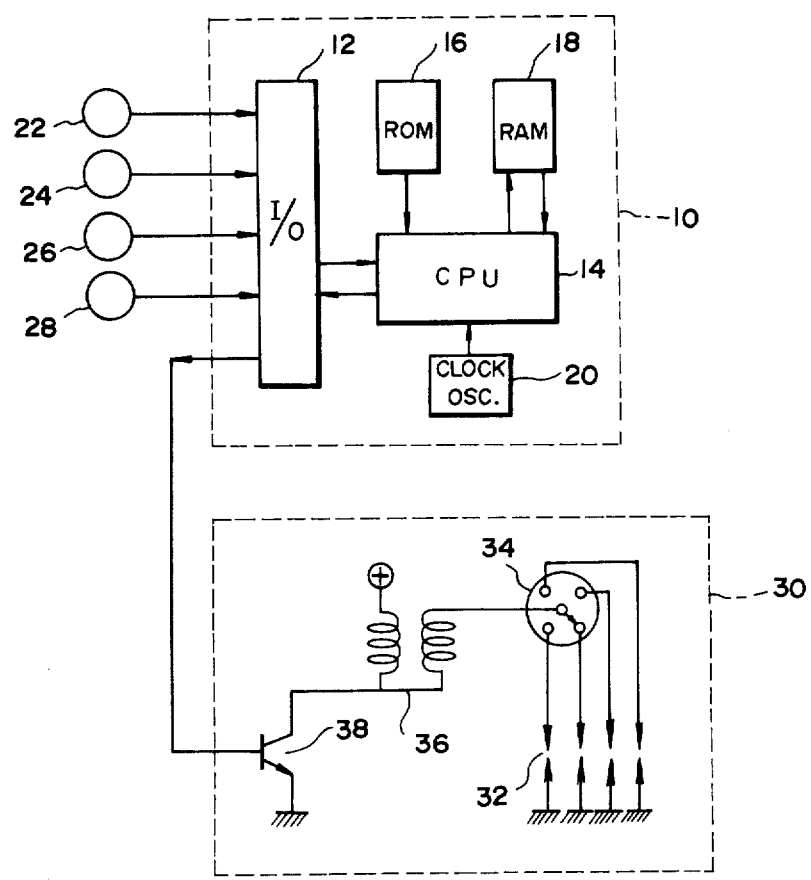
FIG. 1 is a circuit diagram showing one embodiment of a spark-timing control system made in accordance with the present invention.

Referring first to FIG. 1, there is illustrated one embodiment of a spark-timing control system made in accordance with the present invention. The spark-timing control system comprises a digital computer 10 including an input/output circuit 12, a central processing unit (CPU) 14, a read only memory (ROM) 16, a random access memory (RAM) 18, and a clock oscillator 20. The digital computer 10 performs arithmetic calculations based upon various conditions of the engine that are sensed during its operation and provides an ignition signal for controlling the timing of production of ignition sparks.

For this purpose, the digital computer 10 has inputs from various sensors which include a crankshaft position sensor 22, a load sensor 24, a throttle switch 26, and a fuel cut-off sensor 28. The crankshaft position sensor 22 is associated with the engine crankshaft for providing a reference electrical pulse at a predetermined number of degrees of rotation of the engine crankshaft. For example, the crankshaft position sensor 22 may produce a reference pulse each time the engine crankshaft rotates through 180 degrees for 4-cylinder internal combustion engines and through 120 degrees for 6-cylinder internal combustion engines. The crankshaft position sensor 22 also provides a series of crankshaft position electrical pulses each corresponding to a unit angle, for example, one degree of rotation of the engine crankshaft.

A true indication of engine load may be obtained by the measurement of both engine speed and output torque, but a satisfactory sensor for measuring engine output torque is not available at this time. Because of this, the load sensor 24 provides an inference of engine load by sensing the amount of air to the engine. The throttle switch 26 is adapted to provide a signal except when the throttle valve is fully closed or in its idle position. The fuel cut-off sensor 28 is adapted to provide a signal when fuel to the engine is cut off or fuel injection pulses to the fuel injectors are cut off.

The ignition signal from the digital computer 10 is applied to an ignition system 30 which includes spark plugs 32, a distributor 34, an ignition coil 36, and a switching transistor 38. The transistor 38 is normally conductive to prevent production of a high voltage across the ignition coil 36 and becomes non-conductive to cause ignition sparks between the gaps of the spark plugs 32 in response to an ignition signal from the digital computer 10.

The operation of the spark-timing control system of the present invention is as follows: The ROM 16 has a number of optimum spark-timing values previously stored therein in connection with the corresponding engine speed and intake air quantity values. The expression "optimum spark-timing values" as used throughout this invention is intended to mean "angles before or after the top dead center position of each piston which are set to achieve maximum output torque". The digital computer 10 performs the operational steps of: reading an optimum spark-timing value out of the ROM 16 in terms of sensed engine speed (inferred from crankshaft position pulses) and intake air quantity each time a reference pulse is applied from the crankshaft position sensor 22; and providing an ignition signal when the number of crankshaft position pulses counted after the occurrence of the reference pulse reaches the read value. The ignition signal renders the transistor 38 non-conductive to permit generation of a high voltage across the ignition coil 36, causing ignition sparks between the gaps of the spark plugs 32. Furthermore, the digital computer 10 detects engine re-acceleration following fuel-cut in accordance with signals from the throttle switch 26 and the fuel cut-off sensor 28 and retard the spark timing from the read optimum spark-timing value a constant angle or an angle corresponding to the read value. This operation is effective to smooth engine output torque changes and reduce uncomfortable shock.

Figure 2:
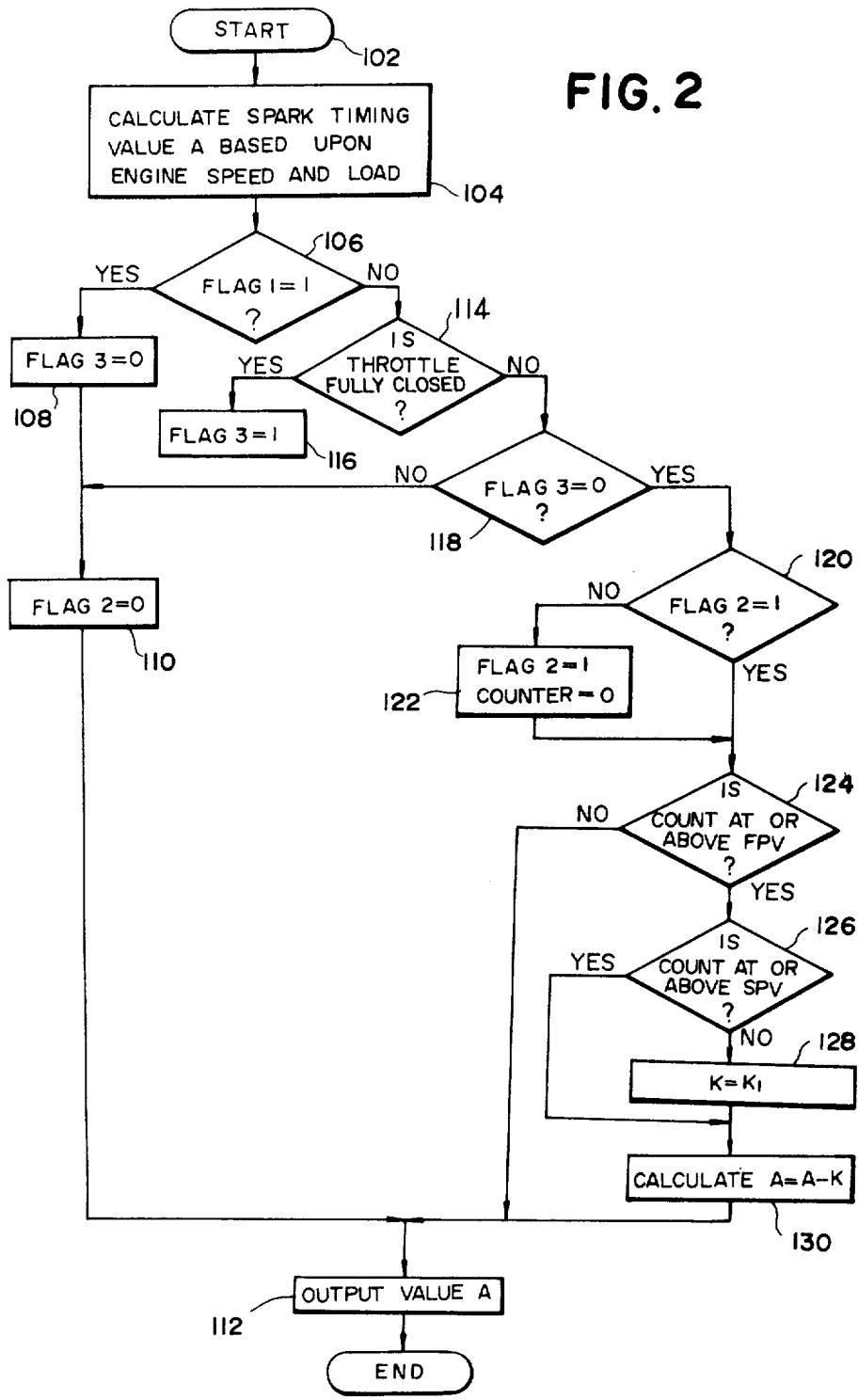
FIGS. 2 and 3 are flow diagrams illustrative of the operation of the digital computer used in the control system of FIG. 1.
Figure 3:
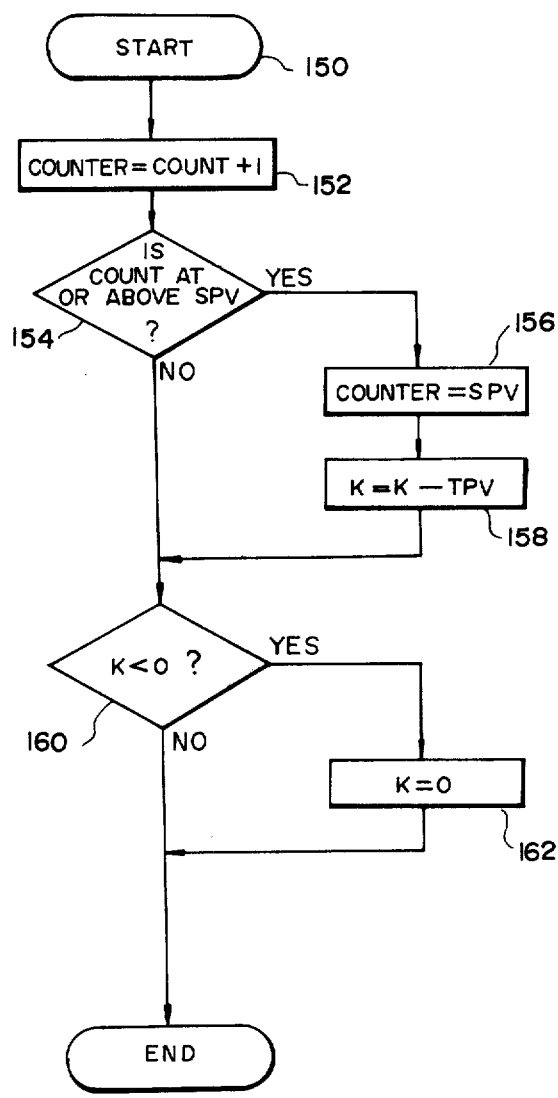

With particular reference now to FIGS. 2 and 3, the operation of the present invention will be further described.

FIG. 2 is a flow diagram of the programming of the digital computer 10. In FIG. 2, flag 1 is used to indicate whether or not fuel to the engine is being cut off. Flag 1 is set to 1 in a fuel cut-off condition and is set to 0 in a fuel-delivery condition. Flag 2 is used to indicate whether or not spark-timing retard was made in the previous program execution. Flag 2 is set to 1 if any spark-timing retard was made in the previous program execution and is set to 0 if spark timing retard is made first in the present program execution. Flag 3 is used to indicate whether or not the fuel cut-off condition is released while the throttle valve is fully closed; that is, whether or not the engine speed falls below a predetermined value and fuel delivery is resumed during engine deceleration. Flag 3 is set to 1 if the answer is Yes. Flag 3 is set to 0 when fuel delivery is resumed after the throttle valve becomes open or during engine re-acceleration.

The computer program is entered at point 102. At point 104 in the program, the digital computer determines an optimum spark timing value A as a function of engine speed and engine load.

At the point 106, a determination is made as to whether flag 1 is 1 or 0. If flag 1 is 1, which represents a fuel-cut condition, the program proceeds to a point 108 where flag 3 is set to 0 and then to a point 110 where flag 2 is set to 0. Following this, the program proceeds to a point 112 where the determined optimum spark timing value A is outputted.

At the point 106, if flag 1 is 0, which represents a fuel-delivery condition, the computer program proceeds to a determination step at a point 114. The determination at the point 114 is whether or not the throttle valve is fully closed. If the throttle valve is fully closed; that is, if the engine speed falls and fuel delivery is resumed during engine deceleration, flag 3 is set to 1 at a point 116. Following this, the program proceeds to the point 110 and then to the point 112 where the determined optimum spark timing value A is outputted.

At the point 114, if the throttle valve is open, the program proceeds to another determination step at a point 118. The determination at the point 118 is whether or not flag 3 is 0. If flag 3 is 1, which represents engine re-acceleration in a fuel delivery condition requiring no spark-timing retard, then the program proceeds to the point 110 and hence to the point 112 where the determined optimum spark-timing value A is outputted.

At the point 118, if flag 3 is 0, which represents engine re-acceleration in a fuel cut-off condition, the computer program proceeds to a point 120 with which a spark-timing retarding step starts.

At the point 120, a determination is made as to whether or not flag 2 is 1. If flag 2 is 0; that is, if the program is entered first to the point 120, then the program proceeds to a point 122 where flag 2 is set to 1 and the counter is set to 0 and then to a point 124. At the point 120, if flag 2 is 1, then the program proceeds directly to the point 124.

At the point 124, a determination is made as to whether or not the count on the counter is at or above a first predetermined value, for example, in the range of 0.1 to 0.2 seconds. If the answer to this question is No, the program proceeds directly to the point 112 where the determined optimum spark-timing value A is outputted. The point 124 is provided to permit the spark-timing to retard a time (0.1-0.2 seconds) after the start of engine re-acceleration. To retard the spark-timing simultaneously with the start of engine re-acceleration, the point 124 may be removed or the first predetermined value is set to 0.

At the point 124, if the answer to the question is Yes, the program proceeds to another determination at a point 126. This determination is whether or not the count on the counter is at or above a second predetermined value which is larger than the first predetermined value and may be in the range of 0.1 to 0.5 seconds. If the answer to this question is No, the program proceeds to a point 128 where the retard K is set to its initial value K1, for example, in the range of 10° to 30°, and then to a point 130.

At the point 130 in the program, the digital computer calculates a spark-timing value by subtracting the initial retard value K1 from the determined optimum spark-timing value A. At the point 112, the difference A-K1 is outputted as a spark-timing value. Accordingly, the spark-timing is retarded by the retard value K1 from the optimum spark timing when the count on the counter is between the first and second predetermined values.

At the point 126, if the answer to the question is Yes, the program proceeds directly to the point 130, in which case the spark-timing retard K is determined in accordance with the computer program of FIG. 3.

This computer program is entered at the start point 150 at a constant interval or at a predetermined number of degrees of rotation of the engine crankshaft. At the point 152, the counter increments by one. Following this, the program proceeds to a determination step at the point 154. This determination is whether or not the count on the counter is at or above the second predetermined value. If the answer to this question is Yes, the program proceeds to a point 156 where the count is set to the second predetermined value and then to a point 158 where the digital computer calculates a spark-timing retard K by subtracting a third predetermined value from the spark-timing retard value K. Following this, the program proceeds to a point 160. If the answer to the question is No at the point 154, the program proceeds directly to the point 160.

At the point 160 in the program, a determination is made as to whether or not the spark-timing retard value K is negative. If the retard value K is negative, the value K is set to zero at the point 162. Otherwise, the retard value K is outputted.

Accordingly, the retard value is reduced by the third predetermined value each time the program proceeds to the spark-timing retarding step beginning with the point 120 of FIG. 2 and eventually reduced to zero. In other words, when the count on the counter increases above the second predetermined value, the spark-timing retard gradually decreases and eventually reaches zero where the spark-timing becomes equal to the optimum spark-timing value A. Such gradual reduction of the spark-timing retard permits smooth shift to normal spark-timing control.

Figure 4:
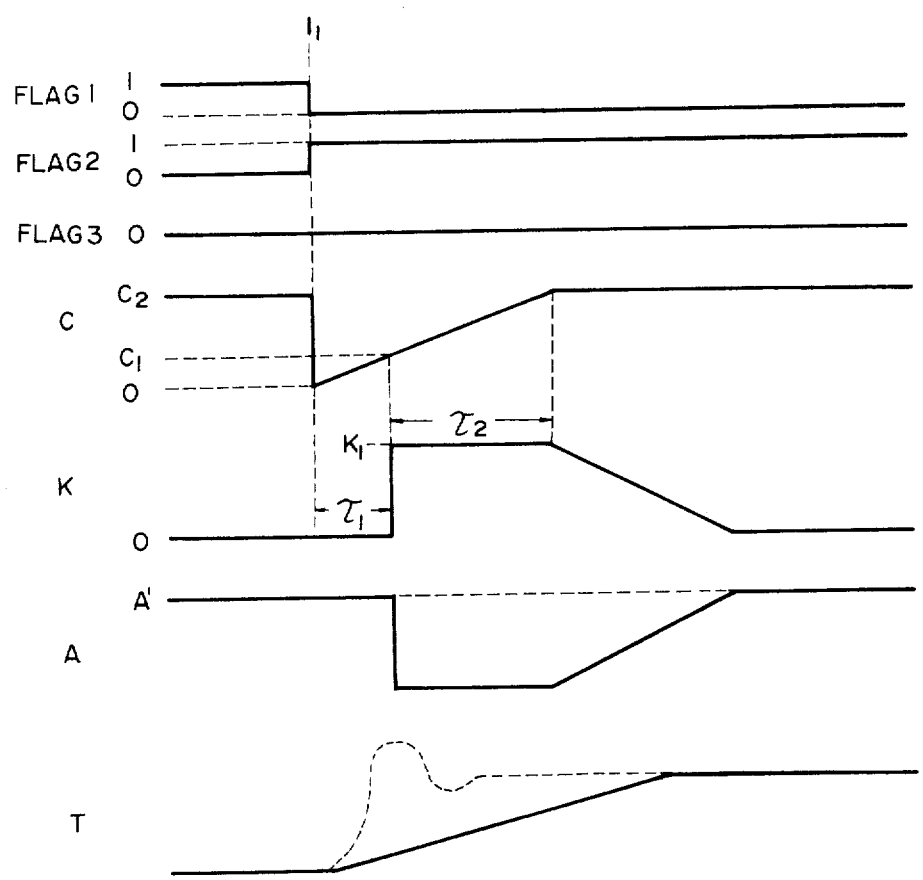
FIG. 4 is a diagram showing changes occurring in various points of the computer programs of FIGS. 2 and 3 when the engine is accelerated again while fuel to the engine is cut off.

FIG. 4 illustrates changes which occur in various points of the computer programs of FIGS. 2 and 3 when the engine is accelerated again at a time t1 while fuel to the engine is cut off.

In FIG. 4, flag 1 changes from 1 to 0, flag 2 changes from 0 to 1, and flag 3 remains at 0. The count on the counter changes to zero at the time t1 and gradually increases to its first predetermined value C1 in a time $\tau1$ and further to its second predetermined value C2 in a time $\tau2$. The spark-timing retard K changes to its initial value K1 the time $\tau1$ after the engine starts accelerating, remains at the value K1 for the time $\tau2$, and then gradually decreases to zero. The spark-timing A is retarded the time $\tau1$ after to a predetermined value at which it is held for the time $\tau2$. Thereafter, the spark-timing A gradually returns to its optimum value A'. In FIG. 4, the broken line indicates output torque changes with conventional systems.

It is preferable to control the initial value K1 of the spark-timing retard K according to the optimum spark-timing value A' determined at the time by the digital computer.

It is to be noted that the same control can be made if the No line from the point 154 of FIG. 3 is connected to the line from the point 156 to the point 158.

As described above, the present invention can achieve smooth engine output torque change and prevent shock attendant upon engine re-acceleration by retracting the spark-timing from the optimum spark-timing when the engine accelerates under a fuel cut-off condition.

While the present invention has been described in conjunction with a specific embodiment thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. A spark-timing control system for controlling the timing of ignition spark in an internal combustion engine, said system being associated with a fuel control means for terminating fuel delivery to said engine when the engine speed is above a predetermined value and in the presence of a deceleration condition, said fuel control means being operable to resume fuel delivery to said engine in response to a demand therefor when the engine speed falls below the predetermined value or in the presence of an acceleration condition, said system including a digital computer operable to:
   (a) calculate an optimum value of spark timing in terms of engine load at which said engine is operating;
   (b) retard the spark timing by a retard value with respect to the calculated optimum spark timing value upon the occurrence of a demand for fuel delivery resumption;
   (c) maintain the spark timing of a series of successive sparks retarded by the retard value with respect to the calculated optimum spark timing value for a predetermined time after the occurrence of the demand for fuel delivery consumption; and
   (d) after the step (c), gradually advancing the spark timing to the calculated optimum spark timing value.

2. A spark-timing control system for controlling the timing of ignition spark in an internal combustion engine, said system being associated with fuel control means for terminating fuel delivery to said engine when the engine speed is above a predetermined value and in the presence of a deceleration condition, said fuel control means being operable to resume fuel delivery to said engine in response to a demand therefor when the engine speed falls below the predetermined value or in the presence of an acceleration condition, said system including a digital computer operable to:
   (a) calculate an optimum value of spark timing in terms of engine load at which said engine is operating;
   (b) retard the spark timing by a retard value with respect to the calculated optimum spark timing value a predetermined time after the occurrence of a demand for fuel delivery resumption;
   (c) maintain the spark timing of a series of successive sparks retarded by the retard value with respect to the calculated optimum spark timing value for a predetermined time after said step (b); and
   (d) after said step (c), gradually advancing the spark timing to the calculated optimum spark timing value.

3. A spark-timing control system for controlling the timing of ignition spark in an internal combustion engine, said system being associated with fuel control means for terminating fuel delivery to said engine when the engine speed is above a predetermined value and in the presence of a deceleration condition, said fuel control means being operable to resume fuel delivery to said engine in response to a demand therefor when the engine speed falls below the predetermined value or in the presence of an acceleration condition, said system including a digital computer operable to:
   (a) calculate an optimum value of spark timing in terms of engine load at which said engine is operating;

(b) retard the spark timing by a retard value with respect to the calculated optimum spark timing value upon the occurrence of a demand for fuel delivery resumption;
(c) maintain the spark timing of a series of successive sparks retarded by the retard value with respect to the calculated optimum spark timing value for a predetermined angle of rotation of said engine; and
(d) after the step (c), gradually advancing the spark timing to the calculated optimum spark timing value.

4. A spark-timing control system for controlling the timing of ignition spark in an internal combustion engine, said system being associated with fuel control means for terminating fuel delivery to said engine when the engine speed is above a predetermined value and in the presence of a deceleration condition, said fuel control means being operable to resume fuel delivery to said engine in response to a demand therefor when the engine speed falls below the predetermined value or in the presence of an acceleration condition, said system including a digital computer operable to:

(a) calculate an optimum value of spark timing in terms of engine load at which said engine is operating;
(b) retard the spark timing by a retard value with respect to the calculated optimum spark timing value a time corresponding to a predetermined angle of rotation of said engine after the occurrence of a demand for fuel delivery resumption;
(c) maintain the spark timing of a series of successive sparks retarded by the retard value with respect to the calculated optimum spark timing value for a predetermined angle of rotation of said engine; and
(d) after the step (c), gradually advancing the spark timing to the calculated optimum spark timing value.

5. The spark-timing control system of claim 1 or 2 or 3 or 4, wherein the retard value is a predetermined value.

6. The spark-timing control system of claim 1 or 2 or 3 or 4, wherein the retard value corresponds to the calculated optimum spark timing value.

* * * * *